United States Patent Office 2,767,108
Patented Oct. 16, 1956

2,767,108

CARAMEL COLOR MANUFACTURE FROM STARCH HYDROLYSATES

Walter R. Fetzer, Clinton, Iowa, assignor, by mesne assignments, to Standard Brands Incorporated, New York, N. Y., a corporation of Delaware No Drawing. Application January 19, 1955, Serial No. 482,891

5 Claims. (Cl. 127—34)

This invention relates to the manufacture of caramel color from corn starch hydrolysates. More specifically it relates to an improved process for the manufacture of caramel color which is more economical than present practices, and which results in a product of quality equal or superior to caramel colors now in commerce.

Caramel color has been made for many years by the treatment of various sugar syrups at high concentration and high temperature with ammonia and/or ammonium salts and alkalies. Many different sugar containing products have been employed as starting raw materials, but each has had its drawbacks or disadvantages Among these materials are the "70" and "80" crude corn sugars, produced by the corn wet milling industry, and these latter named sugars are the customary starting materials for the commercial manufacture of caramel color today in spite of certain inherent disadvantages.

According to one known commercial process, a crude corn sugar such as "70" or "80" sugar, having a D. E. in the range of 80 to 93 is used in the manufacture of caramel color. The D. E. here referred to is the amount of reducing sugars present, calculated as dextrose and expressed as a percentage of the total dry substance.

These crude sugars are normally shipped and sold in solid form and when used for caramel color manufacture must first be melted by heat to a syrupy mass and then may be subjected to an acid heat treatment while at a density of about 45° Bé., enough sulfuric acid being added thereto to lower the pH to about 1.0, and the syrup is heated to a temperature range of about 230° to 240° F. for about one hour. This acid heat treatment of this high D. E. and high density crude corn sugar has as one measurable effect, that of lowering the D. E. to about 40 to 50 depending on concentration and time. Thereafter anhydrous ammonia is added to the solution to raise the pH to about 6.7, and the material is maintained at a temperature of about 235° F. for a short period of time, such as fifteen minutes to two hours, after which it is cooled to about 210° F. Sodium acid sulfite, $NaHSO_3$ and ammonium sulfate $(NH_4)_2SO_4$ are then added. The temperature of the syrup is raised to 270–290° F. for about two hours, after which the finished caramel is cooled.

Whether the "70" or "80" corn sugars are used in accordance with the foregoing described procedure or otherwise these sugars have certain inherent disadvantages, among which are the following:

(1) In the course of their usual manufacture, following the hydrolyzing step, such sugar syrups as "70" and "80" sugar syrups will not remain liquid at room temperatures, hence are run into molds, allowed to solidify and cure and either remain as billets or are chipped and bagged.

(2) In solidified form these products must be handled manually, either in billets or in bags or chips. Manual handling is required by the manufacturer for loading, and by the purchaser for unloading, storing, and transfer to the caramel process. All are costly operations.

(3) The solidified sugars must be remelted before caramelization can begin. This is both slow and costly.

(4) Alternatively with the three disadvantages discussed above, while the original concentrated crude sugar syrup may be kept in liquid form by keeping the temperature elevated, this requires heating and also heated or insulated means of transportation and storage—a still more costly procedure and one not generally used.

(5) The caramel manufacturing process using crude sugars results in some 4 to 5% loss of corn sugar dry substance by condensation polymerization of the dextrose.

(6) Prolonged heating of the dextrose in such crude sugars during the caramel-making process has a pronounced tendency to form and precipitate humic substances which cloud the caramel color product and must, therefore, be removed. Their formation and removal also results in further loss of sugar dry substance.

(7) Crude corn sugars normally contain 0.08 to 0.12% "crude protein" ($N \times 6.25$) residual after the refining operation. This protein is a known cause of foaming which delays the caramel making process.

It is, therefore, not surprising, in view of the above and other disadvantages, that there has been considerable dissatisfaction among caramel manufacturers with the performance of these crude corn sugars as a starting material for caramel manufacturers.

For many years it was commonly believed by caramel producers that the above mentioned crude sugars, containing largely dextrose, were the best and probably the only materials from which good caramel color could be manufactured. Corn syrups (non-crystallizing) heretofore were not used because their dextrose content was considered to be too small and the dextrin content too large. It was believed that such corn syrups containing a high dextrin content would require a prolonged "burning" time, if processed in accordance with prior known methods of caramel manufacture, and the presence of dextrin in the finished caramel would produce a highly viscous caramel, unacceptable to the trade and imparting to such a caramel undesirable properties when used in alcoholic extracts or concentrates such as precipitation of the dextrin.

The composition of three conventional or commercial corn syrups, each converted to a different D. E. level, and two typical commercial corn sugars, are compared in the following tables of typical analyses:

| Type | Corn Syrups (43° Bé.) (Non-crystallizing) | | | Crude Sugars (crystallizable) | |
|---|---|---|---|---|---|
| | Low Conversion | Medium Conversion | High Conversion | "70" | "80" |
| Moisture____percent__ | 20.6 | 19.7 | 18.5 | 18.0 | 12.0 |
| D. E._____ | 30 | 42 | 58 | 84 | 91 |
| Dextrose_____percent__ | 9.3 | 17.2 | 31.0 | 62.0 | 77.0 |
| Other Sugars___do____ | 31.6 | 33.0 | 30.8 | 20.0 | 11.0 |
| Dextrin_____do____ | 38.5 | 30.1 | 19.8 | nil | nil |
| Specific Rotation degrees__ | 169 | 149 | 122 | 68 | 56 |
| N×6.25_____percent__ | 0.04 | 0.04 | 0.04 | 0.08 | 0.12 |

My invention, which is the subject of this patent application, provides a means whereby ordinary non-crystallizing corn syrup of commerce can be advantageously employed in the manufacture of high quality caramel color, obviating the aforementioned disadvantages inherent in the use of corn sugars.

The present invention differs importantly from the above described commercial caramel color process in that the material employed as the first step in the caramelizing process, instead of being a crystallizable corn sugar having a D. E. in the range above 80, is preferably a corn syrup identical with or similar to the ordinary and well-known non-crystallizing corn syrups of commerce; these corn syrups having a D. E. ranging between 30 and 58, more commonly about 42, and usually marketed at density ranges of 42°–45° Bé. I have found that caramel color produced from a non-crystallizable corn syrup of the type just mentioned can be produced more economically for a number of reasons. Corn syrup as a starting material customarily can be manufactured at lower cost than chipped or billet crude sugars, and can be stored or shipped as a liquid in bulk in tank cars. The lower cost of corn syrup results from the use of less acid for hydrolysis, less steam required for the hydrolysis, less evaporation required because of the higher concentration at which the hydrolysis of corn syrups usually is carried out, and less refining required because of lesser solubilization of impurities resulting from the milder hydrolytic conditions employed. The economies of bulk handling and storage of syrups for any purpose as opposed to manual handling of bag or billet sugar are well-recognized in the industry. I have also found that the production of a good caramel is more satisfactorily accomplished with greater freedom from spoiled batches because there is less danger of humic degradation when corn syrup is employed, and the "burning" itself is carried out more expeditiously without foaming. This is due to the fact that corn syrups are more easily refined and have a lower and less modified organic nitrogeneous content than do crude sugars.

As the desirable characteristics sought in caramel color manufacture are well known to caramel color manufacturers and users, no exhaustive discussion of these characteristics is needed here; however, it may be well to point out briefly a few of the most commonly mentioned desirable characteristics.

Of course, the primary characteristic sought in the manufacture of caramel color is that the product have a high and uniform tinctorial power so that it may be economically and conveniently used for coloring the various beverages and other food products to which it may be added.

Another advantage sought is that the caramel color have excellent acid fastness, meaning stability in solutions having acid reactions, as caramel color is frequently used in carbonated and still beverages and beverage concentrates where the presence of acids may tend to cause precipitation or sedimentation of color bodies from the caramel color itself. Such flocs or sediment would impair the appearance of, and therefore be highly objectionable in said beverages.

Since caramel color is normally shipped and stored at densities ranging from 36 to 42° Bé. and at such densities is a heavy viscous liquid, it is important that the liquid be not too viscous for convenient pumping, pouring, and other forms of handling peculiar to its manufacture and use. Unfortunately many caramel colors heretofore produced by most processes exhibit a tendency when stored for a period as long as six mouths or more, to increase very substantially in viscosity—in some cases enough to require special heating to reduce the viscosity to a point adequate for proper handling.

It is the general object of this invention to produce high quality caramel color from a sugar base never before used successfully for this purpose and by manufacturing methods possessing new and desirable features when applied to this base.

More specifically, it is an object of this invention to produce more economically a caramel color not only with uniform superior acid fastness, but also high stability in alcohol, and exhibiting high resistance to increase in viscosity or jelling or to deterioration during storage.

In the practice of this invention non-crystallizing starch hydrolysates such as commercial corn syrups, for example, are employed. Among such hydrolysates are those which are the product of conventional hydrolysis to within a D. E. range of about 30 to 58, equivalent to a specific rotation range of about 169° to 122°. Such hydrolysates are usually obtained by hydrolysis of starch slurries at concentrations not higher than 24° Bé., corresponding to 42.65% dry substance. After hydrolysis, filtering and refining, by conventional methods, if desired, such hydrolysates, for use in this process, must be concentrated to a density preferably within a range of about 42° to 45° Bé., corresponding to 77.5% to 85.5% dry substance, and are non-crystallizing.

By starting with corn syrup my invention affords new advantages in both closed and open kettle methods of caramel manufacture. As the first step in a closed kettle process the corn syrup is acidified in a closed jacketed kettle with sulfuric acid or hydrochloric acid to a pH of about 0.5 to 2.0 and heated within a range of 200°–250° F. for a period of ½ to 4 hours until the specific rotation is reduced to a value not higher than 110°, and preferably between 90° and 100°. This reduction in rotation, which will be observed in this treatment of all corn syrups of an initial 58 D. E. or less, largely reflects the hydrolysis of dextrin. In addition, this acid heat treatment produces substantial rearrangement in the sugars through the condensation polymerization of the dextrose initially present and that formed from the hydrolysis of the dextrin.

Where dextrose is initially present in relatively small amounts, as is the case in corn syrups in contrast with corn sugars, the polymerization condensation of the dextrose proceeds with less tendency for humic degradation to occur.

The treatment, further, shows surprising and unexpected results, for the D. E. may increase, remain unaltered, or decrease, depending upon the initial D. E. and the Baumé of the corn syrup, but in every instance the specific rotation of the syrup will decrease.

The acid heat treatment of corn syrup produces little or no increase or decrease in the total sugar solids, since the gain in sugar solids through the hydrolysis of the dextrin tends to offset the loss in sugar solids resulting from the polymerization condensation of the dextrose. The loss in sugar solids by polymerization condensation of dextrose is of considerable economic magnitude where corn sugars are employed in a caramel process.

After the above described effect has been achieved by the acid-heat treatment of the corn syrup at high density, ammonia is then added to produce caramel color. Preferably, the bulk of the total ammonia employed, that is, at least 60%, will be added as anhydrous ammonia, aqueous ammonia or ammonium carbonate.

After the reaction of the initial charge of ammonia has raised the tinctorial power of the mixture to a range of about 8 to 10 for 22 power caramel or about 15 for 40 power caramel, slightly more than ⅓ of the final desired tinctorial power, the temperature is preferably lowered to about 230° F. and the remainder of the ammonia is added in the form of salts such as ammonium sulfite, ammonium sulfate, ammonium phosphate or ammonium chloride. Of the named salts ammonium sulfate is preferred, and while, for the sake of brevity, it alone will be mentioned hereinafter, any of the other salts may be substituted therefor.

The total ammonia to be employed is governed by the degree of tinctorial power desired or required in the finished product. The tinctorial power and acid fastness are increased by using more ammonia and are decreased by using less. It has been found that 0.5% to 3.0% of ammonia, expressed as a percentage of the weight of the total dry substances of the syrup, may be employed to produce commercial caramel colors. About 1% of ammonia as employed in this process will suffice to produce high quality caramel color of about 22 tinctorial power, and 3% will produce high quality caramel of 40 tinctorial power. To produce a tinctorial power of 20 one may use 0.75% ammonia. The 1% of ammonia employed as herein described is about the minimum amount of ammonia which will produce caramel of the acid fastness required by such beverages as the cola types and pale ginger ales.

Tinctorial power, as herein mentioned, is determined by matching the color of a 1% solution of the caramel, contained in a one inch cell, against Lovibond glasses, Series 52 Caramel.

The anhydrous ammonia preferably is added to the syrup first, usually supplied from a liquid source, releasing the ammonia vapor into the heated syrup contained in the closed jacketed vessel, to avoid loss of ammonia. After the ammonia has been added the reaction may, if desired, be accelerated advantageously by raising the temperature of the syrup to the upper end of a range of 200° F. to 250° F. for about 30 minutes to 2 hours. If a temperature near 200° F. be employed several hours may be required for the ammonia reaction. The temperature and duration of this heating step are subject to considerable variation in accordance with the speed of reaction deemed desirable or convenient.

To buffer the mixture so that the desired pH is maintained, alkaline reagents are added, simultaneously with the ammonia salt, if desired. These reagents to be added are sodium sulfite ($Na_2SO_3$) or sodium acid sulfite, ($NaHSO_3$), in such proportion as to constitute about 2½ to 3 times the total weight of the ammonia, as $NH_3$, and the other chemical may be the above mentioned ammonium sulfate, for example, and in such quantity that the sulfuric acid liberated as the ammonia is reacted with the sugars will reduce the final pH of the material to about 2.5 to 3.2. After the chemicals have been added the material should be then heated to what is called the caramelizing temperature, that is, 260°–280° F., preferably in the range of 270° F.–280° F., until the desired tinctorial power is developed, which usually requires a period of about two hours. Caramelizing temperatures as low as 240° F. may be used but require too much additional time and are therefore not recommended. Above 280° F. is likewise not recommended as the reaction proceeds so rapidly that termination at the proper point would be difficult. The caramel is then cooled to 200° F. or lower to terminate the caramelization, and after dilution with water, it may be clarified.

This cooling may be quickly accomplished by venting the kettle to the atmosphere which drops the temperature to about 230° F. The caramel may be further cooled by the addition of cold water which also decreases the viscosity, decreases the density to the conventional commercial range of about 38° Baumé, and decreases the tinctorial power to the conventional 22, or to some other desired ultimate tinctorial power. If desired, cooling water may be used in the jacket of the kettle, to effect still further cooling.

As a specific example of the practice of my invention, I started by placing 1,600 gallons of non-crystallizing, unbuffered corn syrup of 38.8 D. E., equivalent to a specific rotation of 154°, pH 4.5, and 44.2° Baumé in a closed kettle. To this I slowly added 10.6 gallons of 50% sulfuric acid over the course of 30 minutes. This reduced the pH to 0.9. In the meantime I heated the syrup to 230° F. and held it at this temperature for a period of one hour. During this time the D. E. increased to 45.2, and the specific rotation decreased to 95.4°. I then added 158 pounds of anhydrous ammonia over the course of the next 30 minutes, while the temperature was maintained at 230° F. The temperature was then raised to 250° F. and held there for two hours, during which time the tinctorial power developed to 8.5. The batch was then cooled to 220° F. and 136 pounds of dry ammonium sulfate and 502 pounds of dry sodium bisulfite added. The kettle was then closed and the temperature raised to about 275° F. under a pressure of about 25 to 30 pounds, being accompanied by such venting of vapors and gases as may be required for the maintaining of this pressure. After two hours, holding at 275° F. plus or minus 5° F., the tinctorial power had increased to 25.3. The kettle was then vented and cooling started. Venting alone reduced the temperature to 230° F. At this point, 400 gallons of water was added, which further cooled the batch to 200° F., reduced the gravity to 38.1° Baumé, and cut the tinctorial power to 22.1. The batch was then further cooled to 170° F. and finally clarified in a filter press. The final pH was 2.9. This caramel color was carbonated beverage caramel of the highest quality by every standard test. The elapsed time for the operation was about 8 hours.

When "70" and "80" sugars were used in the first described known commercial process as a starting material there was no dextrin originally present in the material and the dextrose content, high originally, was greatly decreased in the initial acid heat treatment step.

When my invention is practiced, using corn syrup as starting material, there is originally present only a low dextrose content and a high percentage of dextrin, the latter heretofore found only to be a distinct detriment to a caramel process, but in the initial acid heat treatment step this dextrin is converted entirely into sugars.

Because of the difficulty of analyzing the product of my initial acid heat treatment step it is not known exactly what the proportions of its various sugars are, but it is possible to determine by test and it has been determined that the dextrin has disappeared.

The subsequent treatment with ammonia and the added chemicals is conducted in the absence of the dextrin. The residual thickening effect of dextrin in the final caramel color product which would generally have been expected prior to this invention is found not to exist in the product of this invention.

The final caramelized product possesses all of the desirable standard characteristics of high quality caramel color, yet may be manufactured more economically from a starting material heretofore never successfully used for caramel color manufacture. Considerable experience with the practice of the invention has taught that uniformity of results in the manufacture of high quality caramel color is more easily attained with the practice of this invention than when one manufactures caramel color from the high D. E. corn sugars, such as "70" and "80" corn sugars.

While in the example given above there is shown the use of sodium acid sulfite and ammonium sulfate, one may use sulphur dioxide or sodium sulfite in place of the sodium acid sulfite, and in place of ammonium sulfate one may use any of the other named ammonium salts, as heretofore stated.

The specific example given above was for the manufacture of what is called "carbonated beverage caramel color" characterized by high acid fastness and high tannin resistance, usually having a tinctorial power of 22, and a pH between 2.7 and 3.3. A large quantity of a different kind of caramel color is made and sold, known as "bakers' or confectioners' caramel color." This caramel color is usually required to have a tinctorial power higher than 22, namely about 30; it usually has high acid fastness although this is not essential, and it may have little or no tannin resistance. It conventionally has a final pH of about 4.5 to 5.5.

To manufacture bakers' or confectioners' caramel color, the acid-heat treatment step described in the specific example above will be followed. For the same amount of starting corn syrup at the illustrated density and D. E., there will be added 386 pounds of anhydrous ammonia, no other chemicals being required. After this quantity of anhydrous ammonia has been added, the temperature would be raised rapidly to 270–280° F. and the batch held at that temperature until a tinctorial power of 34 is achieved. Thereafter cooling as described in the example would be practiced but only about 300 gallons of cold water will suffice to lower the density to the conventional 38° Bé. and the final tinctorial power to 30 which many customers demand. However, commercial bakers' caramel may range from 20 to 40 in tinctorial power.

Because of the elimination of the step of adding ammonium salts, the more rapid development of tinctorial power due to the higher percentage of ammonia, and the customary elimination of the final filtration or clarification, this bakers' caramel can be made in about two hours less time than can the beverage type.

The sugar base of this invention, made from non-crystallizing corn syrup, is found to be equally satisfactory as a sugar base for the manufacture of either type of caramel color, that is, either beverage or bakers'.

Thus far only the use of the closed kettle process has been described but either of these types of caramel may be made in accordance with my invention by an open kettle process. In this latter type of process, because the kettle is constantly vented to the atmosphere, anhydrous ammonia is not used. Instead, aqueous ammonia and the ammonium salts and alkaline reagents (when required for beverage caramel) are added directly to the kettle in accordance with the practices well known in the industry.

This application is a continuation-in-part of my application Serial No. 393,220, filed November 19, 1953, now abandoned.

Corn syrup when mentioned in the appended claims means non-crystallizing corn syrup having a D. E. between about 30 and 58 and of commercial quality, filtered and refined after its hydrolysis, in accordance with conventional practices. Such material is unexcelled for use in my invention.

It should be understood that the process steps described above are subject to some variations without departing from the spirit and scope of the invention described in the appended claims.

Having described my invention, I claim:

1. In a method of producing caramel color, the steps comprising acidifying non-crystallizable corn syrup of between 42° and 45° Bé and having a D. E. in the range of about 30 to about 58 to a pH between 0.5 and 2.0, heating the acidified syrup to between 200° and 250° F. until its specific rotation has decreased below 110°, thereafter treating the acidified syrup with ammonia in the range of 0.75 to 3% of the weight of the syrup solids and at a temperature between 260 and 280° F. until the tinctorial power of the syrup has increased to between 20 and 40, and thereafter terminating the caramelizing effect by cooling the syrup and diluting it with water to a final desired condition.

2. A method of producing caramel color comprising utilizing as a starting material a non-crystallizable starch hydrolysate having a D. E. between about 30 and 58 produced by hydrolysis and filtered and refined after hydrolysis, acidifying said starting material at 42° to 45° Bé. to lower the pH to about 0.5 to 2.0 and heating the same to between 200 and 250° F. until the specific rotation has decreased to at least 110°, and thereafter adding ammonia in the range of 0.75% to 3% of the weight of the dry solids in the hydrolysate, all of said ammonia so added being selected from the group consisting of anhydrous ammonia, aqueous ammonia and ammonium carbonate heatinge the mixture to a temperature of 260 to 280° F. until the tinctorial power of the mixture exceeds 20 to 40, and thereafter cooling and diluting the mixture with water to a desired final gravity and tinctorial power.

3. A method of producing caramel comprising utilizing as a starting material a non-crystallizable starch hydrolysate having a D. E. between about 30 and 58 produced by hydrolysis and filtered and refined after hydrolysis, acidifying said starting material at 42° to 45° Bé. to lower the pH to about 0.5 to 2.0 and heating the same to between 200 and 250° F. until the specific rotation has decreased to at least 110°, and thereafter adding ammonia in the range of 0.75% to 3% of the weight of the dry solids in the hydrolysate, at least 60% of said ammonia being selected from the group consisting of anhydrous ammonia, aqueous ammonia and ammonium carbonate and the balance being a salt selected from the group consisting of ammonium sulfite, ammonium sulphate, ammonium phosphate and ammonium chloride, adding an alkaline reagent selected from the group consisting of sodium sulfite and sodium acid sulfite in amount varying between 2.5 and 3.25 times the total weight of ammonia used, heating the mixture to a temperature of 260 to 280° F. until a tinctorial power between 20 and 40 is effected, and thereafter cooling and diluting the mixture with water to the desired final gravity and tinctorial power.

4. A method of producing caramel, comprising utilizing as a starting material a non-crystallizable starch hydrolysate having a D. E. between about 30 and 58 produced by hydrolysis and filtered and refined after hydrolysis, acidifying said starting material at 42° to 45° Bé. to lower the pH to about 0.5 to 2.0 and heating the same to between 200 and 250° F. until the specific rotation has decreased to at least 110°, and thereafter adding ammonia in the range of 0.75% to 3.0% of the weight of the dry solids in the hydrolysate, at least 60% of said ammonia being selected from the group consisting of anhydrous ammonia, aqueous ammonia and ammonium carbonate and the balance later added being a salt selected from the group consisting of ammonium sulfite, ammonium sulphate, ammonium phosphate and ammonium chloride, heating the mixture containing the ammonia from the first group to a range of 200 to 250° F. until the mixture attains a tinctorial power of slightly more than one-third of the final desired tinctorial power and then adding the above said balance of ammonia, adding an alkaline reagent selected from the group consisting of sodium sulfite and sodium acid sulfite in amount varying between 2.5 and 3.25 times the total weight of ammonia used, heating the mixture to a temperature of 260 to 280° F. until a tinctorial power between 20 and 40 is effected, thereafter cooling and diluting the mixture with water to the desired final gravity and tinctorial power.

5. A method of making caramel color comprising acidifying a corn syrup of about 39 D. E. and about 44° Bé. to a pH of about 1, heating the acidified syrup to about 230° F. until its D. E. has been raised to about 45 and its specific rotation lowered to below 100°, thereafter treating the syrup with ammonia and heat between 230° and 280° F. until the tinctorial power of the material increases to between 20 and 40, and thereafter terminating the caramelization by cooling and dilution with water.

References Cited in the file of this patent
UNITED STATES PATENTS 2,582,261    Longenecker _____ Jan. 15, 1952